US 6,561,018 B2

(12) United States Patent
Mancosu et al.

(10) Patent No.: US 6,561,018 B2
(45) Date of Patent: May 13, 2003

(54) METHOD AND DEVICE FOR MONITORING THE INSTANTANEOUS BEHAVIOR OF A TIRE DURING THE RUNNING OF A MOTOR VEHICLE

(75) Inventors: Federico Mancosu, Milan (IT); Giuseppe Matrascia, Seregno (IT); Elda Gelosa, Lissone (IT); Piero Misani, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/142,243

(22) Filed: May 10, 2002

(65) Prior Publication Data
US 2002/0166373 A1 Nov. 14, 2002

Related U.S. Application Data

(63) Continuation of application No. PCT/EP00/11038, filed on Nov. 8, 2000
(60) Provisional application No. 60/183,337, filed on Feb. 18, 2000.

(30) Foreign Application Priority Data

Nov. 18, 1999 (EP) .............................. 99830714

(51) Int. Cl.$^7$ ............................ G01M 17/02
(52) U.S. Cl. ....................................... 73/146
(58) Field of Search .............................. 73/146, 146.2, 73/146.5; 340/442, 443, 444

(56) References Cited

U.S. PATENT DOCUMENTS 6,293,140 B1  9/2001 Lohberg ................. 73/146

FOREIGN PATENT DOCUMENTS

| DE | 39 35 588 A1 | 4/1991 |
| DE | 39 37 966 A1 | 5/1991 |
| DE | 196 20 581 A1 | 11/1997 |
| EP | 0 456 774 B1 | 11/1991 |
| WO | WO 91/08129 | 6/1991 |

OTHER PUBLICATIONS

Germann, St. et al., "Monitoring of the Friction Coefficient Between Tyre and Road Surface", Proceedings of the Conference on Control Applications, US, New York, IEEE, vol. 3, pp. 613–618, (1994). (No month).

Primary Examiner—William Oen
(74) Attorney, Agent, or Firm—Finnegan, Henderson, Farabow, Garrett & Dunner, L.L.P.

(57) ABSTRACT

A method for monitoring the instantaneous behavior of a tire includes the steps of acquiring and storing at least one basic reference curve representing variation of a displacement of at least one specified point of the tire in at least one of three spatial directions as a function of a spatial position of the at least one specified point during at least one portion of a revolution of the tire, continuously acquiring first signals representing the spatial position of the at least one specified point, deriving from the spatial position signals of the at least one specified point at least one cyclic curve of current operating displacement in at least one spatial direction, continuously comparing the at least one cyclic curve of current operating displacement with the at least one basic reference curve, and emitting a second signal depending on results of the comparison. A related device is also disclosed.

32 Claims, 9 Drawing Sheets

VERTICAL VELOCITY

METHOD AND DEVICE FOR MONITORING THE INSTANTANEOUS BEHAVIOR OF A TIRE DURING THE RUNNING OF A MOTOR VEHICLE

CROSS-REFERENCE TO RELATED APPLICATIONS

This application is a continuation application of International Application No. PCT/EP00/11038, filed Nov. 8, 2000, in the European Patent Office, the contents of which are relied upon and incorporated herein by reference; additionally, Applicants claim the right of priority under 35 U.S.C. §119(a)–(d) based on patent application No. 99830714.4, filed Nov. 18, 1999, in the European Patent Office; further, Applicants claim the benefit under 35 U.S.C. §119(e) based on prior-filed, provisional application No. 60/183,337, filed Feb. 18, 2000, now abandoned in the U.S. Patent and Trademark Office.

BACKGROUND OF THE INVENTION

1. Field of the Invention

The present invention relates to a method and device for monitoring the instantaneous behavior of a tyre during the running of a motor vehicle.

2. Description of the Related Art

A tyre of a motor vehicle, when rolling on a road surface, is subject to a vertical load and to longitudinal and transverse external forces which are generated in the various manoeuvres, such as braking, acceleration, cornering, etc.

During each manoeuvre, any point on the tyre rolling in steady state and in transitory conditions carries out a movement which can be represented by displacements in the three spatial directions (Cartesian co-ordinates) for each cycle of the revolution of the tyre. The movement of the point has characteristics which are typical of the position of each particular point of the tyre, of the structure and of the external profile of the tyre, of the conditions of use (velocity, load and pressure), of the conditions of the surface on which the tyre rolls, and of the external forces to which the tyre is subjected in the manoeuvres of braking, acceleration, cornering, etc.

SUMMARY OF THE INVENTION

The inventors have perceived that the variation of the displacements in space of a specified point, located on the rolling tyre and subject to specific forces, has the same basic shape (basic curve) for each revolution of the tyre, while it varies as to the position and amplitude of the peaks, and/or the start and end of each peak, and the relative maxima and/or minima. Similarly, the variation of velocity in the space of the point has the same basic shape for each revolution of the tyre.

The inventors have identified a set of basic reference curves which represent cyclic reference displacements in space, and the relative velocities for each specified point of the tyre in specified running conditions. More particularly, the basic reference curves are acquired and stored either during the running of the motor vehicle on the road or in the course of standard tests or by means of calculation. The inventors have found that these basic reference curves can advantageously be used to make comparisons of various kinds with cyclic operating curves and to obtain, from these comparisons, information on the behaviour of the tyre when rolling, on the forces exchanged, on the surface on which it is rolling, on the conditions of use, on the circumstances of adhesion (friction) available at each moment between the tyre and the road, etc., in the instant in question. In particular, it is possible to ascertain the way in which the displacement (or velocity) of the point concerned varies with time, when moving from perfect adhesion to total slip of the tyre.

The information acquired by means of the comparison can be used to set interventions on the mechanisms of the motor vehicle and to monitor its behaviour, for example during braking, acceleration, drift, and similar.

In the case of the present description and the following claims, the significance of the term "continuously", relating to the phases of signal acquisition, signal comparison and similar, also covers acquisition and comparison carried out at times separated from each other by brief intervals, where the duration of these intervals is sufficiently brief to enable the behaviour of the tyre in the running conditions in question to be represented in a significant way. Typically, the maximum duration of such an interval is equal to the time required for a tyre to complete a whole revolution of 360° at the velocity in question.

In a first aspect, the invention relates to a method for monitoring the instantaneous behaviour of a tyre during the running of a motor vehicle, the said tyre comprising at least one tread and one casing, three spatial directions—one longitudinal, one transverse and one vertical—being associated with the said tyre, and the said method comprising the steps of a) acquiring and storing, at least temporarily, at least one basic reference curve which represents the variation of the displacement of at least one specified point of the said tyre in at least one of the said three spatial directions, as a function of the spatial position of the said point, in at least one portion of a revolution of the said tyre, b) continuously acquiring signals of the position in space of the said at least one point of the said tyre, in at least one portion of a revolution of the said tyre, c) deriving from the said position signals at least one cyclic curve of current operating displacement of the said at least one point in the said at least one of three specified spatial directions, as a function of the spatial position of the said point, in at least the said portion of a revolution of the said tyre, d) continuously comparing the said curve of current operating displacement with the said basic reference curve of displacement which is stored, and e) emitting a signal depending on the said comparison, the said signal indicating the said instantaneous behaviour of the said tyre.

In one embodiment, the said basic reference curve of displacement mentioned in point a) above is acquired during the running of the motor vehicle on the road, in the course of one revolution of the tyre, and is stored temporarily, for a specified period, to make the said comparison, as mentioned in point d) above, with the said curve of operating displacement acquired in a subsequent revolution of the said tyre.

Typically, the said basic reference curve of displacement which is stored is that of the immediately preceding revolution.

In another embodiment, the said basic reference curve of displacement mentioned in point a) above is acquired in a step which precedes the step of the operation of the said motor vehicle and is stored permanently in order to make the said comparison, as mentioned in point d) above, with the said curve of operating displacement acquired in the said at least one portion of a revolution of the said tyre.

Preferably, a basic reference curve of velocity of the said at least one point in one spatial direction is stored in the said step a), and a cyclic curve of operating velocity of the said at least one point in one spatial direction is determined in the said step c), the said curves of velocity being obtained, respectively, from the said basic reference curve of displacement and from the said curve of operating displacement by means of a mathematical derivative with respect to time, the said basic reference curve of velocity and the said curve of operating velocity being compared in the said step d).

Advantageously, the state of deformation of the said casing in the vicinity of one of its points in an area of contact between the tyre and the road is measured by means of the said basic reference curve and the operating curve of displacement or velocity, to evaluate the adhesion present between the tyre and the road, and the capacity of the said tyre to develop forces tangential to the contact with the said road.

Preferably, signals of the positions of at least two points of the said tyre are acquired in the said step b), and the corresponding curves of operating displacement or velocity are also compared with each other in the said step d) to reveal rapid changes in the aforesaid state of deformation or any acquisition errors.

In a second aspect, the invention relates to a device for monitoring the instantaneous behaviour of a tyre during the running of a motor vehicle, the said tyre comprising at least one tread and one casing, three spatial directions—one longitudinal, one transverse and one vertical—being associated with the said tyre, and the said device comprising i. means for acquiring and storing, at least temporarily, at least one basic reference curve which represents the variation of the displacement of at least one specified point of the said tyre in at least one of the said three spatial directions, as a function of the spatial position of the said point, in at least one portion of a revolution of the said tyre, ii. at least one sensor associated with the said at least one point of the said tyre, capable of emitting, over a period of time, signals of the position in space of the said point, iii. pick-up means capable of continuously acquiring the said signals of the position in space of the said at least one point of the said tyre, in at least the said portion of a revolution of the said tyre, and iv. processor means incorporating a program capable of finding from the said position signals at least one cyclic curve of current operating displacement of the said at least one point in the said at least one of three specified spatial directions, as a function of the spatial position of the said point, in at least the said portion of a revolution of the said tyre, v. the said processor means being capable of continuously comparing the said curve of current operating displacement with the said basic reference curve of displacement which is stored, vi. the said processor means being additionally capable of emitting a signal depending on the said comparison, the said signal indicating the said instantaneous behaviour of the said tyre.

In one embodiment, the said storage means are capable of acquiring and storing temporarily, for a specified time, the said basic reference curve of displacement mentioned in point i) above during the running of the motor vehicle on the road, in the course of one revolution of the tyre, and the said processor means carry out the said comparison mentioned in point v) above between the said temporary basic reference curve of displacement and the said curve of operating displacement, acquired in a subsequent revolution of the said tyre.

In another embodiment, the said storage means are capable of acquiring and storing permanently the said basic reference curve of displacement mentioned in point i) above in a step which precedes the step of operating the said motor vehicle, and the said processor means carry out the said comparison mentioned in point v) above between the said permanently stored basic reference curve of displacement and the said curve of operating displacement acquired in the said at least one portion of a revolution of the said tyre.

Preferably, the said processor means are capable of storing a basic reference curve of velocity of the said at least one point in one spatial direction and are capable of determining a cyclic curve of operating velocity of the said at least one point in one spatial direction, the said curves of velocity being obtained, respectively, from the said basic reference curve of displacement and from the said curve of operating displacement by means of a mathematical derivative with respect to time, the said processor means being capable of comparing the said basic reference curve of velocity with the said curve of operating velocity.

Advantageously, the said processor means measures the state of deformation of the said casing in the vicinity of one of its points in an area of contact between the tyre and the road, by means of the said basic reference curve and the operating curve of displacement or velocity, to evaluate the adhesion present between the tyre and the road, and the capacity of the said tyre to develop forces tangential to the contact with the said road.

Preferably, at least two sensor means are associated with at least two points of the said tyre and emit at least two signals of the position of the said at least two points, and the said processor means determine by means of the said signals at least two curves of operating displacement or velocity, and compare them with each other to reveal rapid changes in the aforesaid state of deformation or any errors in acquisition.

The inventors have observed that, for the purposes of the present invention, the most significant points of the tyre are:

points on the sidewall of the casing, referred to here as points on the casing sidewall level;

points located on the outer surface of the tread of the tyre, referred to here as points at the tread level;

points located on the inner liner of the casing, referred to here as points at the liner level, intermediate points within the structure of the casing (for example points between the tread and the liner of the casing).

Preferably, the point is specified in such a way that it is located on the equatorial plane of the tyre (centre or crown), or on the shoulders of the tyre.

Typical physical quantities measured by the method and device according to the invention are:

longitudinal displacement of the point (direction X), transverse (lateral) displacement of the point (direction Y)

vertical displacement (direction Z).

longitudinal velocity of the point (direction X), transverse (lateral) velocity of the point (direction Y)

vertical velocity (direction Z).

The variation of the displacements or velocities of the point with time can be used to find, from time to time, the current (instantaneous) operating situation of the tyre, for example the state of instantaneous stressing of the tyre and the available adhesion between the tyre and the road.

One of the distinctive characteristics of the method and device according to the invention lies in the fact that the signals originate directly from the tyre, which acts as a sensor, and are not mediated by other mechanical elements, such as a rim or hub of the wheel on which the tyre is fitted. This provides the advantage of avoiding the delay times and potential interference typical of conventional devices to prevent locking in braking (antiskid or ABS) and of conventional devices to prevent slip in acceleration (antislip).

Another distinctive characteristic of the method and device according to the invention lies in the fact that they make it possible to monitor the behaviour of the tyre in braking, acceleration and cornering (drift), owing to the monitoring of the variation with time of the state of longitudinal and lateral deformation of the points of the tyre casing within the footprint.

This capacity to monitor the behaviour of the motor vehicle when cornering, by determining the behaviour of the tyre in the drift condition, is one of the salient aspects of the present invention. This is because, as far as the inventors are aware, none of the known methods and devices has this important characteristic.

In the course of the present description and of the claims, the term "basic curve", also referred to as a "cyclic curve", denotes a curve which represents the variation of either the displacement or the velocity of one point of a tyre in a specified spatial direction as a function of the spatial position of the point, in a revolution of the tyre or in a portion of a revolution, in the conditions under consideration.

BRIEF DESCRIPTION OF THE DRAWINGS

Characteristics and advantages of the invention will now be illustrated with reference to one embodiment represented in the attached figures, in which.

DETAILED DESCRIPTION OF THE PREFERRED EMBODIMENTS

Figure 1:
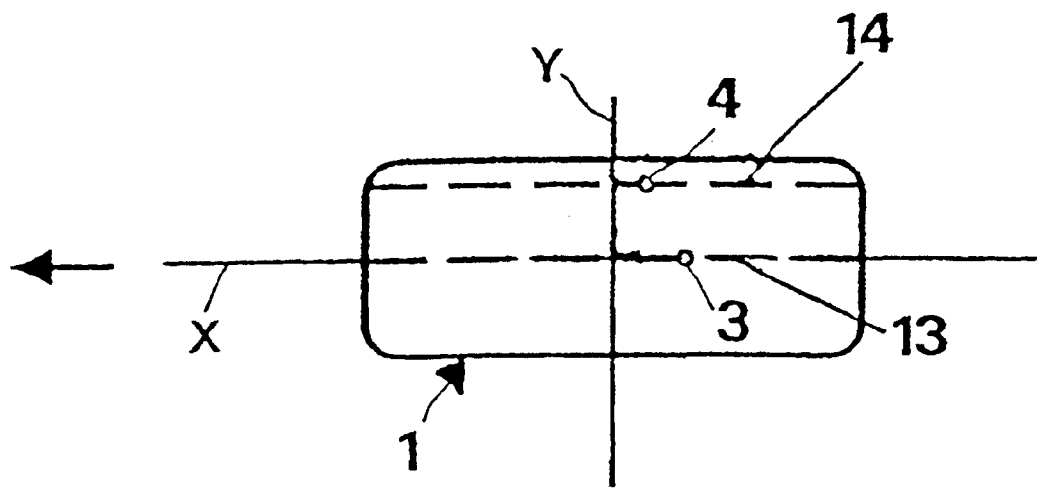
FIG. 1 shows schematically, in a view from above, a rolling tyre having position transducers at certain points.
Figure 2:
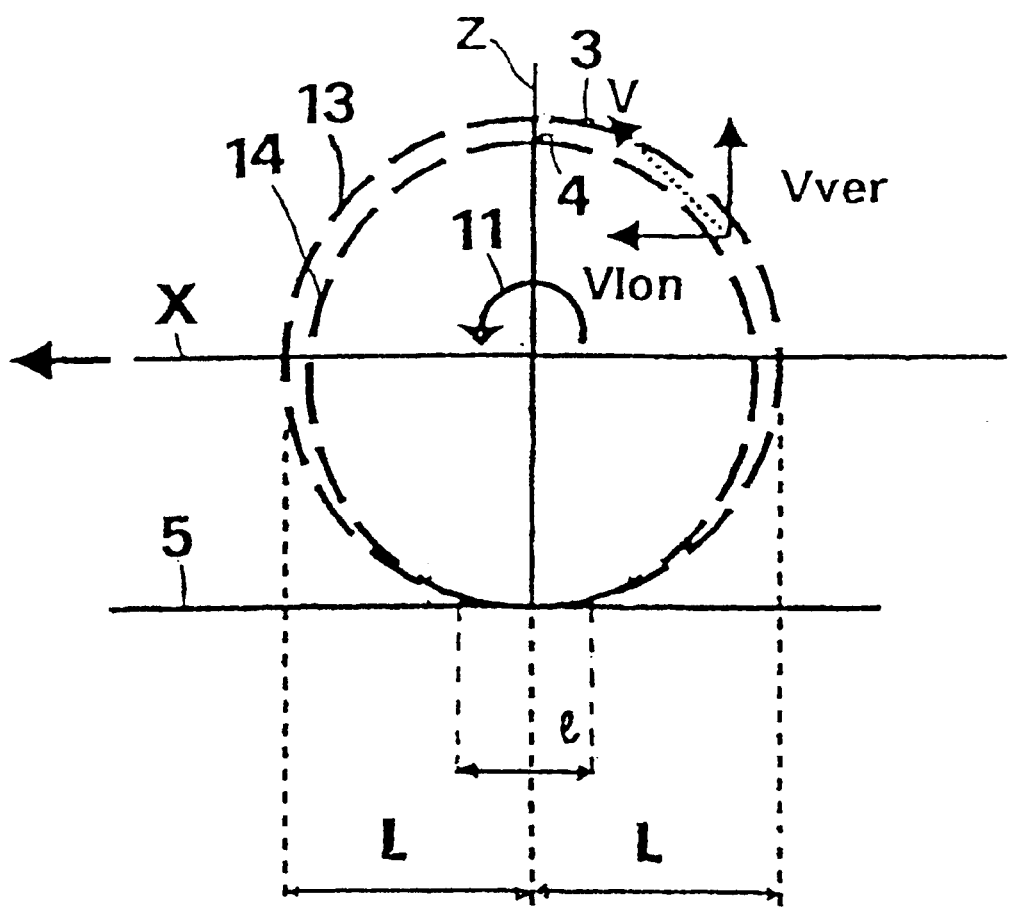
FIG. 2 shows the circumferential trajectories of two points of the tyre of FIG. 1 and the velocity vector of one of its points.

In FIG. 1, the number 1 indicates a tyre for a motor vehicle having a longitudinal axis X (direction of advance), a transverse axis Y (axis of rotation of the tyre) and a vertical axis Z. The direction of rotation of the tyre 1 is indicated by the arrow 11 (FIG. 2). A sensor 3 or a sensor 4, or both, are mounted in the tyre 1. The sensors 3 and 4 are associated with points of the tyre located at tread level, at casing sidewall level, or at liner level, or with intermediate points. The sensor 3 is associated with a point situated on the crown, located on an equatorial plane 13, while the sensor 4 is associated with a point situated on the shoulder, located on a plane 14 which is spaced apart laterally from the equatorial plane and is parallel to it. During the rolling of the tyre, the point of the tyre with which the sensor 3, or the sensor 4, is associated is displaced along a trajectory which generally comprises displacements in the three directions of space. The sensors 3 and 4 emit signals indicating their position with respect to a specified reference, or displacement signals, or velocity signals, or acceleration signals. The sensors 3 and 4 are, for example, of the type for transmission of the signal over a distance, such as infrared, ultrasonic, and similar sensors. Other sensors, mounted at other specified points of the tyre 1, at the tread, casing or liner level, or at an intermediate level, on the crown or shoulder, are not shown.

FIG. 2 shows the vector V of the tangential velocity of one point of the tyre during its rolling and the vectors $V_{long}$ and $V_{vert}$ of its longitudinal and vertical components respectively. The maximum distances L of a point at the tread level on the crown from a vertical plane passing through the axis of rotation of the tyre are also shown. The length I of the footprint area of the tyre in the area of contact with a road surface 5 is also shown.

Figure 3:
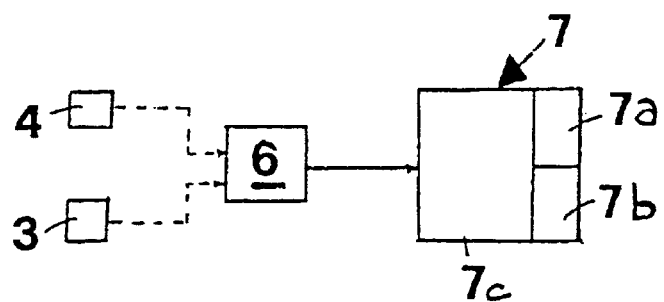
FIG. 3 is a block diagram of a device for monitoring the instantaneous behaviour of the tyre of FIG. 1, made according to the invention.

FIG. 3 shows a block diagram of a device for monitoring the instantaneous behaviour of the tyre of FIG. 1. The sensors 3 and 4, a pick-up 6 associated with the sensors and a controller 7 connected to the pick-up 6 are shown. The controller 7 comprises, for example, a programmed microprocessor having a volatile storage element 7a, a permanent storage element 7b and processor means 7c. The sensors 3 and 4, and any other sensors, are mounted, as stated above, at specified points of the tyre, while the pick-up 6 and the controller 7 are mounted on the motor vehicle. The pick-up 6 is, for example, an ultrasonic pick-up or a photodiode, or of the piezoelectric type, or similar.

Specified basic (cyclic) reference curves of specified physical quantities, such as displacement or velocity, related to the movements of the points of the tyre at which the sensors 3 and 4 and any other sensors are located, are stored in the volatile storage element 7a or in the permanent storage element 7b of the controller 7, in a temporary or permanent way respectively, as will be illustrated subsequently. For example, the basic reference curves, temporary (variable) curves, or constants, which represent, respectively, the cyclic variation, in one revolution of the tyre, of the following physical quantities: vertical velocity $V_{vert}$, longitudinal velocity $V_{long}$, and transverse (lateral) velocity $V_{ltrasv}$ of one or more points of the tyre as a function of their circumferential position, are stored in the store 7a or 7b. The pick-up 6 receives the position signals emitted by the sensors 3 and 4 and sends them to the controller 7 which is programmed to process them. In the controller 7, a cyclic curve of current operating displacement of the point in the vertical, longitudinal or transverse direction in one revolution of the tyre is obtained from the successive signals of the position of the point in question, as a function of the spatial position of the point. The cyclic curve of vertical, longitudinal or transverse operating displacement is compared in the controller 7 with the basic reference curve of vertical, longitudinal or transverse displacement which is stored, and the information on the state of instantaneous stressing of the tyre and/or on the instantaneous adhesion between the tyre and the road is obtained from the comparison.

In one variant, a cyclic curve of the vertical velocity $V_{vert}$, longitudinal velocity $V_{long}$, or transverse velocity $V_{ltrasv}$ of the point in question in operation is determined from the cyclic curve of displacement, by means of a mathematical derivative with respect to time, as a function of the spatial position of the point. In this case, the comparison is made in the controller 7 between the cyclic curve of operating velocity and the basic reference curve of velocity which is stored.

Specified pairs or triplets of spatial position signals emitted by two or more sensors associated with two or more specified points of the tyre are also processed in the controller 7. Two or more curves of operating displacement or two or more curves of operating velocity of the two or more points are found from these signals, and are compared with each other to reveal rapid changes of the state of deformation of the tyre or any acquisition errors (in the latter case, at least a third point has to be monitored).

The information obtained from the comparison between the basic reference curves and the cyclic operating curves can be used subsequently to set control actions of mechanisms of the motor vehicle, for example regulation of the brake system, of the engine air and fuel supply system, of active suspension, and similar.

The temporary basic reference curves are acquired during the running of the motor vehicle on the road, in the course of each revolution of the tyre. The basic reference curves are stored temporarily to carry out the comparison with the current cyclic operating curves, acquired in a successive revolution of the said tyre. For example, the cyclic operating curve acquired in the final revolution of the tyre is compared with a basic reference curve acquired in the penultimate revolution of the tyre or in the i-th preceding revolution.

In particular, it is possible to check, by monitoring the variation with time of the state of longitudinal and lateral deformation (cyclic curve of the longitudinal and lateral displacement or velocity) of one or more points of the casing of the tyre in the footprint area, whether the tyre is or is not in conditions of slip during braking, acceleration or cornering (drift).

Figure 4:
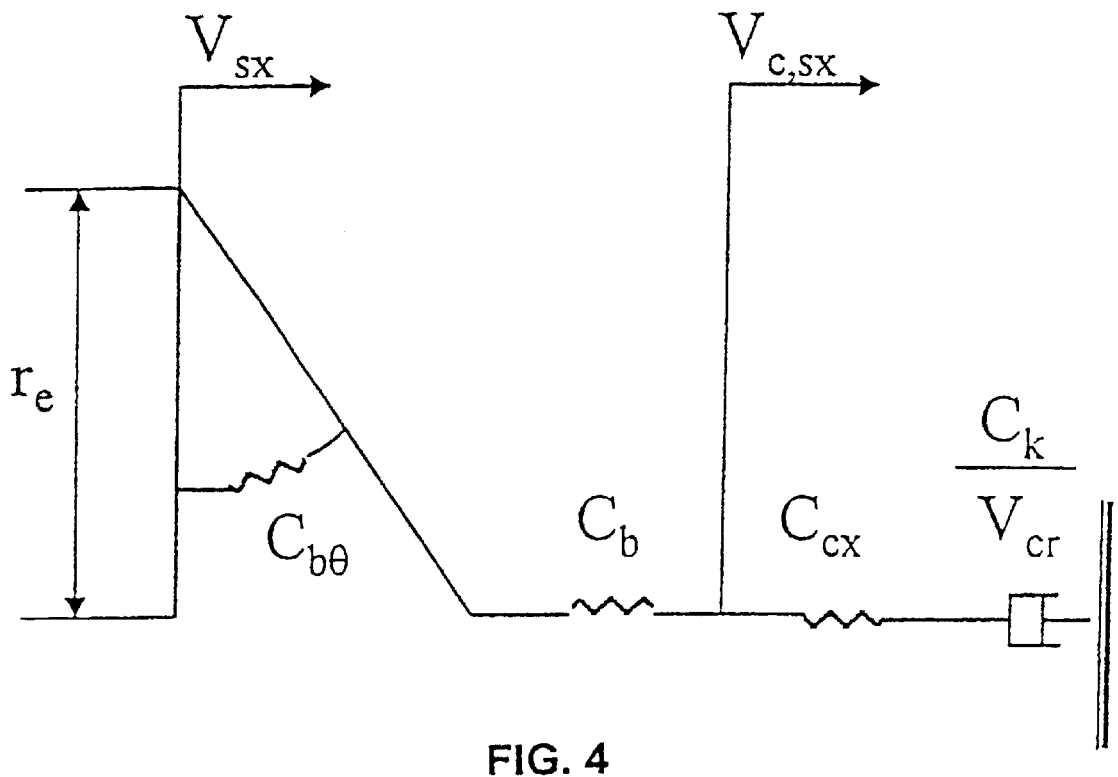
FIG. 4 shows schematically a model of the tyre of FIG. 1, which can be used to describe slip phenomena.

A model of the tyre, shown schematically in FIG. 4, was considered: this can be used to describe the phenomena of slip in the longitudinal direction (braking and acceleration) and in the lateral direction (drift). Where the longitudinal dynamics of the tyre are concerned, the following characteristics are examined:

Structural torsional stiffness of the tyre $C_{b\theta}$;
Structural radial stiffness of the tyre $C_b$;
Longitudinal stiffness of the tread $C_{cx}$;
Resistance to longitudinal slip $C_k$;
Longitudinal stiffness of the tread per unit of length $C_{px}$;
Velocity of slip with respect to the rim $V_{sx}$;
Velocity of slip in the contact area $V_{c,sx}$;
Velocity of advance with respect to the contact $V_{cr}$;
Effective rolling radius $r_e'$
Half-length of the footprint area a.

In the case of slip in the absence of skidding, the ratio of the slip resistance to the half-length of the footprint area is equal to the longitudinal stiffness of the tread:

$$C_k/a = C_{cx} = 2aC_{px}$$

In turn, the longitudinal ground contact force F depends on the state of deformation of the casing and on an equivalent stiffness related to the torsional stiffness $C_{b\theta}$ and radial stiffness $C_b$ (springs in series).

$$1/C_{eq} = 1/C_b + r_e^2/C_{b\theta}$$

$$F = C_{eq} \int_0^{2a} V_{c,sx} \, dt$$

Therefore, by measuring the state of deformation in the casing, and if the torsional and radial structural stiffnesses are known, the ground contact force can be determined. In the case of pure slip, in the absence of skidding, the slip velocity is constant in braking and acceleration, and therefore its integral is a linear function along the contact area. Consequently the state of deformation in the longitudinal direction is of the triangular type; in other words, the deformation is zero at the entry into the contact area and increases gradually to a maximum value at the exit from the contact area.

In case of drift (cornering), the same result is found, by considering the lateral slip or drift (instead of the longitudinal slip), the resistance to lateral slip or drift resistance, the lateral stiffness of the tread, the lateral structural stiffnesses of the casing and sidewalls, and the relaxation length (instead of the half-length of the footprint area). The term "relaxation length" denotes the distance travelled by the tyre before the lateral (drift) force reaches its normal operating value corresponding to the angle of drift that has been set.

When skidding occurs, the ratio of the slip resistance $C_k$ to the half-length of the footprint area is no longer equal to the longitudinal stiffness of the tread $C_{cx}$, but is smaller than the latter and decreases as the skidding increases.

In particular, the slip resistance $C_k$ is equal to the derivative of the force with respect to the slip, calculated for the slip value applicable to the tyre:

$$C_k = \delta F/\delta \xi_{cx}$$

where $\xi_{cx} = \pm V_{c,sx} V_{cr}$.

The phenomena of skidding occurs when the tyre is at the limit conditions of adhesion, in other words when the longitudinal force equals the vertical force multiplied by the coefficient of friction. In particular, in braking, acceleration and drift conditions, the lack of adhesion is manifested in those points of the footprint (contact) area where the local force is maximal and where the deformation is also maximal.

The inventors have observed that, when skidding occurs, the state of the deformations of the casing is partly of the triangular type, and is therefore zero at the entry into the footprint area, maximum within the footprint area, and then drops to a value corresponding to that at which the local longitudinal force equals the product of the coefficient of friction and the local vertical force, and this continues until the exit from the footprint area is reached. The longitudinal force, in turn, no longer has a linear variation with deformation, but increases in a less than linear way until it reaches a maximum value equal to the product of the coefficient of friction and the vertical load acting on the wheel, and then starts to decrease or remains at this maximum value until the wheel locks. This area between the slip value at which the maximum value of the longitudinal force is reached and the maximum value of slip (in other words 1) is called the area of "instability".

The inventors have found that it is possible, by directly measuring the state of deformation of the casing, to identify and signal the condition which the tyre has entered during running on the road, and, in particular, to evaluate the adhesion available between the tyre and the road and to estimate the capacity of the tyre to develop tractive forces tangential to the contact with the road.

This requires the following steps:
  measurement of the longitudinal and lateral deformation of the casing in the vicinity of one of its points during its travel through the footprint area;
  measurement of the variation of the state of deformation with time, to verify the type of the state of deformation, in other words whether it is triangular or composite (that is to say consisting of a triangular part followed by a rapid decrease of deformation due to the lack of adhesion (area of instability)).

The inventors have observed that by measuring the longitudinal and lateral displacement and the corresponding velocities of one point of the casing, during its travel through the contact area, it is possible to verify whether the tyre is being subjected to braking, acceleration, or cornering, and whether or not it is in the area of instability. In this area, the deformation changes from a triangular state to a composite state, with the point of maximum deformation displaced towards the centre of the footprint area. From this moment onwards, when the tyre enters the area of instability, the change is very rapid.

The state of longitudinal deformation is correlated with the slip and the state of lateral deformation is correlated with the value of the angle of drift: in the triangular deformation law, the angle at which the deformation increases consists of the slip for the longitudinal dynamic and the angle of drift for the lateral dynamic.

The method according to the invention is based on the use of the measurement of the displacement/velocity of one point of the casing. This measurement is used to directly measure the variation with time of the state of deformation (change of type of the state of deformation) and the corresponding variation of velocity (of the state of deformation) which is an index of the area of instability of the tyre.

As stated above, the basic reference curves which are stored permanently are determined experimentally, in standard conditions, in a step preceding the running of the motor vehicle on the road.

For example, some basic reference curves are measured and recorded on a motor vehicle running on a test track, at various speeds, on a straight dry road, with one person on board, in conditions of maximum adhesion.

Other basic reference curves are measured and recorded on a motor vehicle running, at various speeds, on a straight dry road, with one person on board, during a braking period of 5 seconds with the brake pedal half depressed.

In turn, the basic reference curves stored temporarily in the volatile storage element are acquired during the running of the motor vehicle on the road, in the course of one revolution of the tyre, to be compared with the current cyclic operating curves acquired in a subsequent revolution of the tyre. In practice, the reference is the revolution of the tyre preceding that which is under observation.

Some examples of particularly significant cyclic curves, usable with the method and device according to the invention, are given below.

Figure 5:
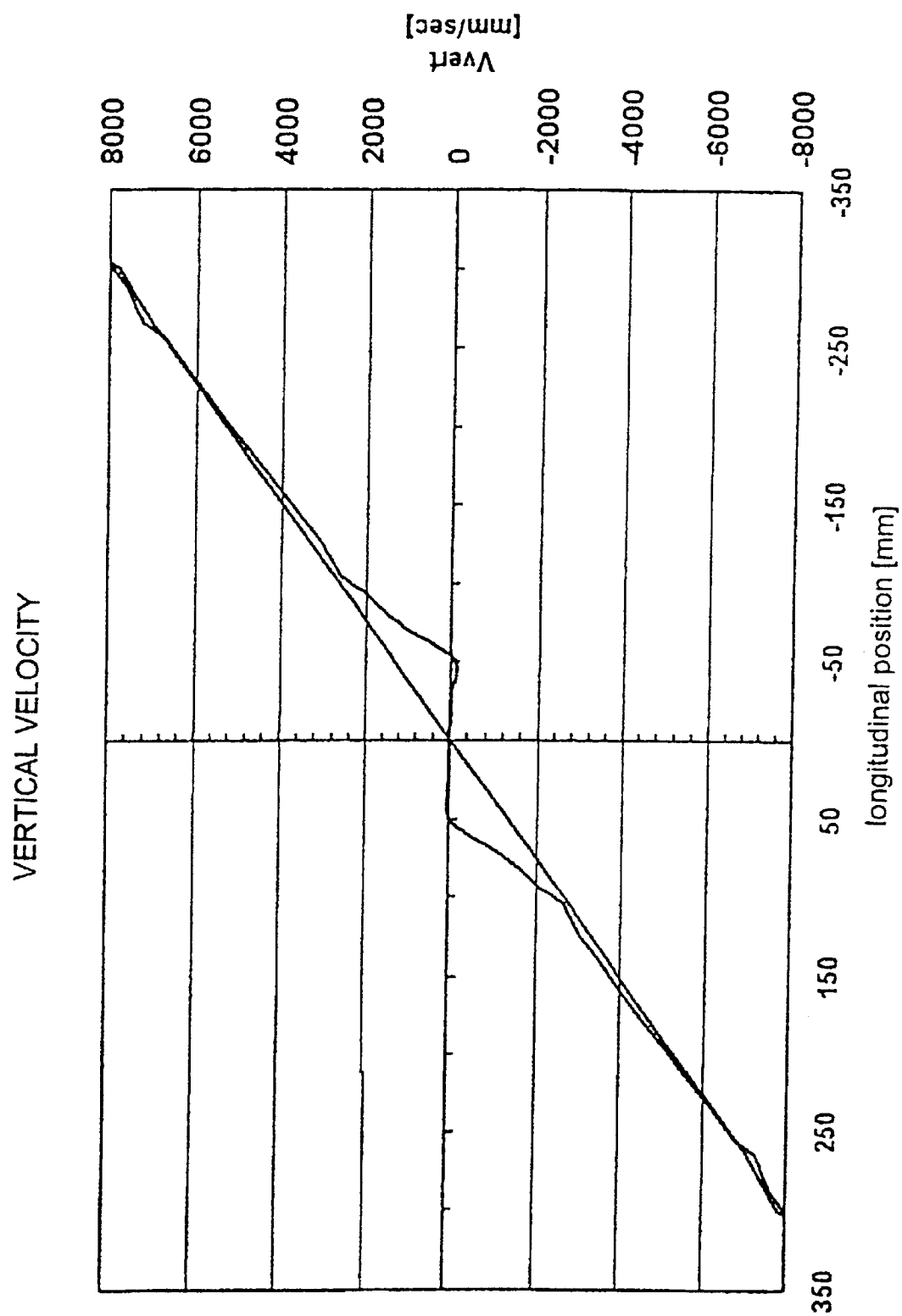
FIG. 5 is a cyclic curve of the vertical velocity of a point at liner level on the crown of the tyre of FIG. 1, in conditions of free (neutral) rolling.

FIG. 5 shows a cyclic curve of the vertical velocity $V_{vert}$ of a point of the tyre situated at liner level on the crown, in the centre, on the equatorial plane. The curve represents the variation of the velocity with the variation of the longitudinal position of the point (distance of the point from a vertical plane passing through the axis of rotation of the tyre), during a complete rotation of the tyre, in a free rolling situation, at a velocity of 30 km/hr, with a vertical load of 250 kg, on a surface having a coefficient of friction of 0.8.

Figure 6:
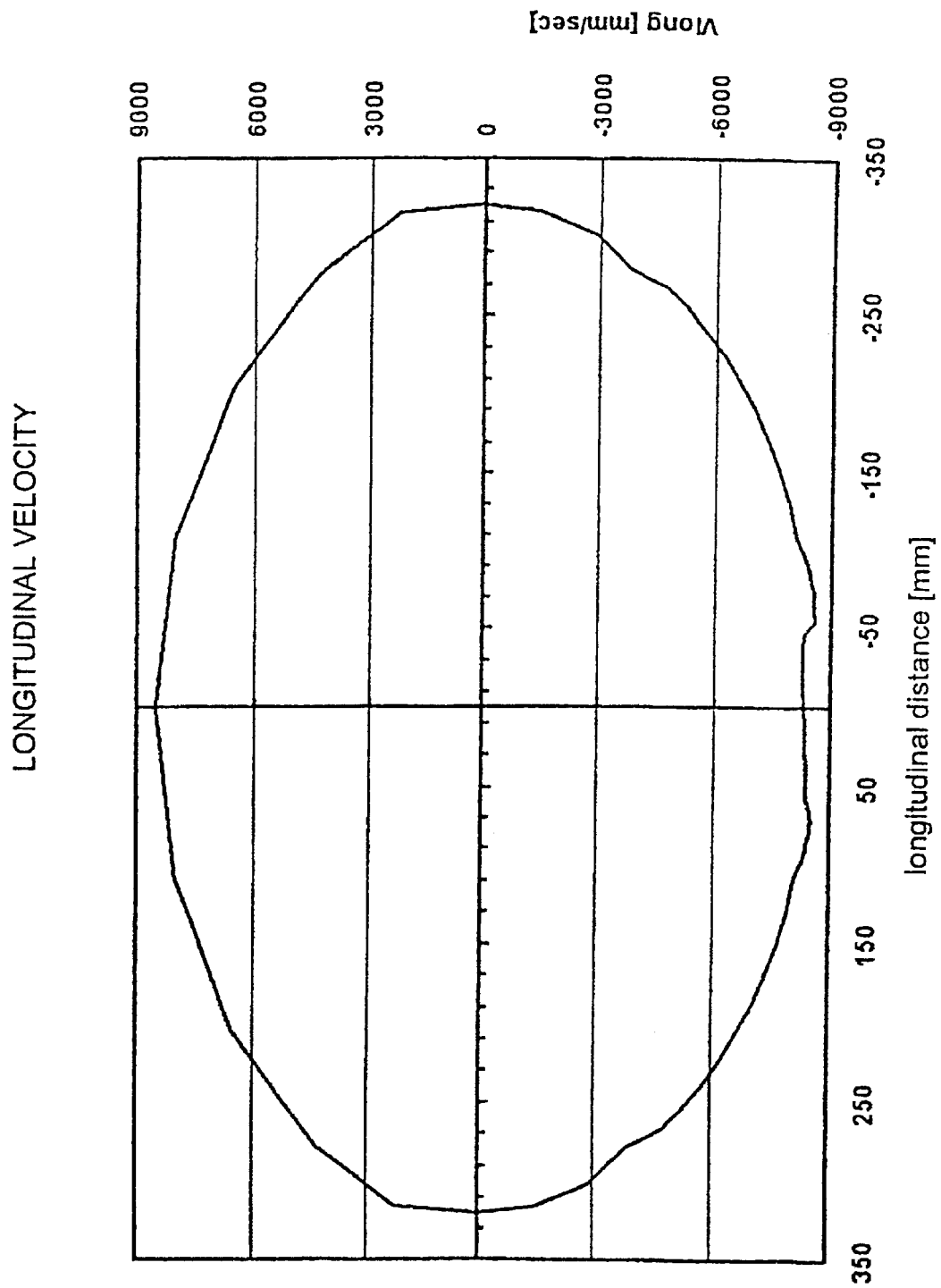
FIG. 6 shows a cyclic curve of the longitudinal velocity of a point at tread level on the crown of the tyre of FIG. 1, in conditions of free (neutral) rolling.

FIG. 6 shows a cyclic curve of the longitudinal velocity $V_{long}$ of the point of the tyre situated at tread level on the crown (sensor 3). The curve is determined as a function of the longitudinal position of the point, during a complete rotation of the tyre, in a free rolling situation at a velocity of 30 km/hr, with a vertical load of 250 kg, on a surface having a coefficient of friction of 0.8.

Figure 7:
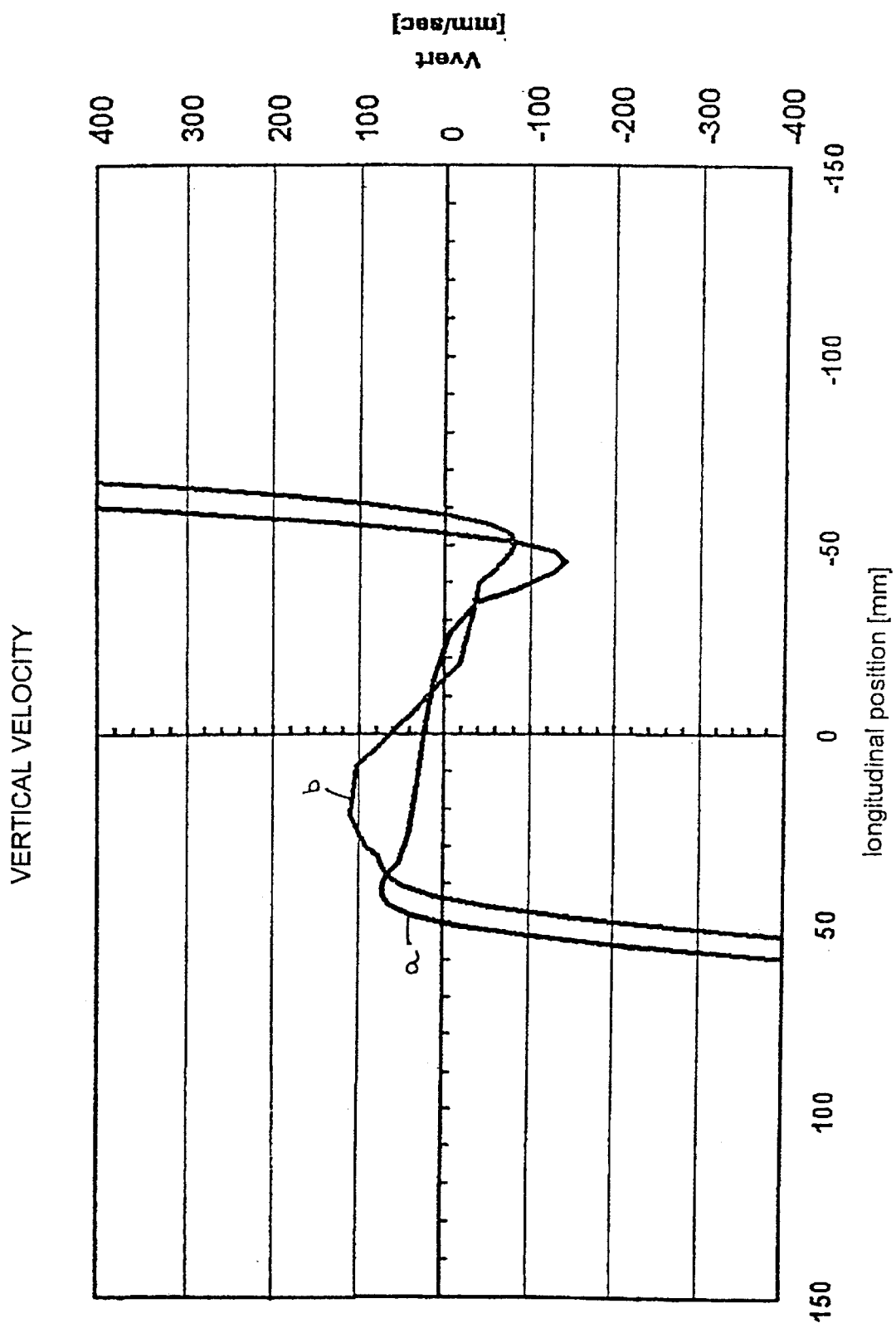
FIG. 7 shows cyclic curves of the vertical velocity of a point at liner level on the crown of the tyre of FIG. 1, in conditions of free (neutral) rolling and braking, with detail on the area of contact between the tyre and the road.

FIG. 7 shows in detail cyclic curves a and b of the vertical velocity $V_{vert}$ of the point of the tyre situated at liner level on the crown, in a situation of free rolling (curve a) at a velocity of 30 km/hr, and braking (curve b). The curves are limited to the longitudinal positions of the point in the footprint area and are determined with a vertical load of 250 kg on a surface having a coefficient of friction of 0.8.

Figure 8:
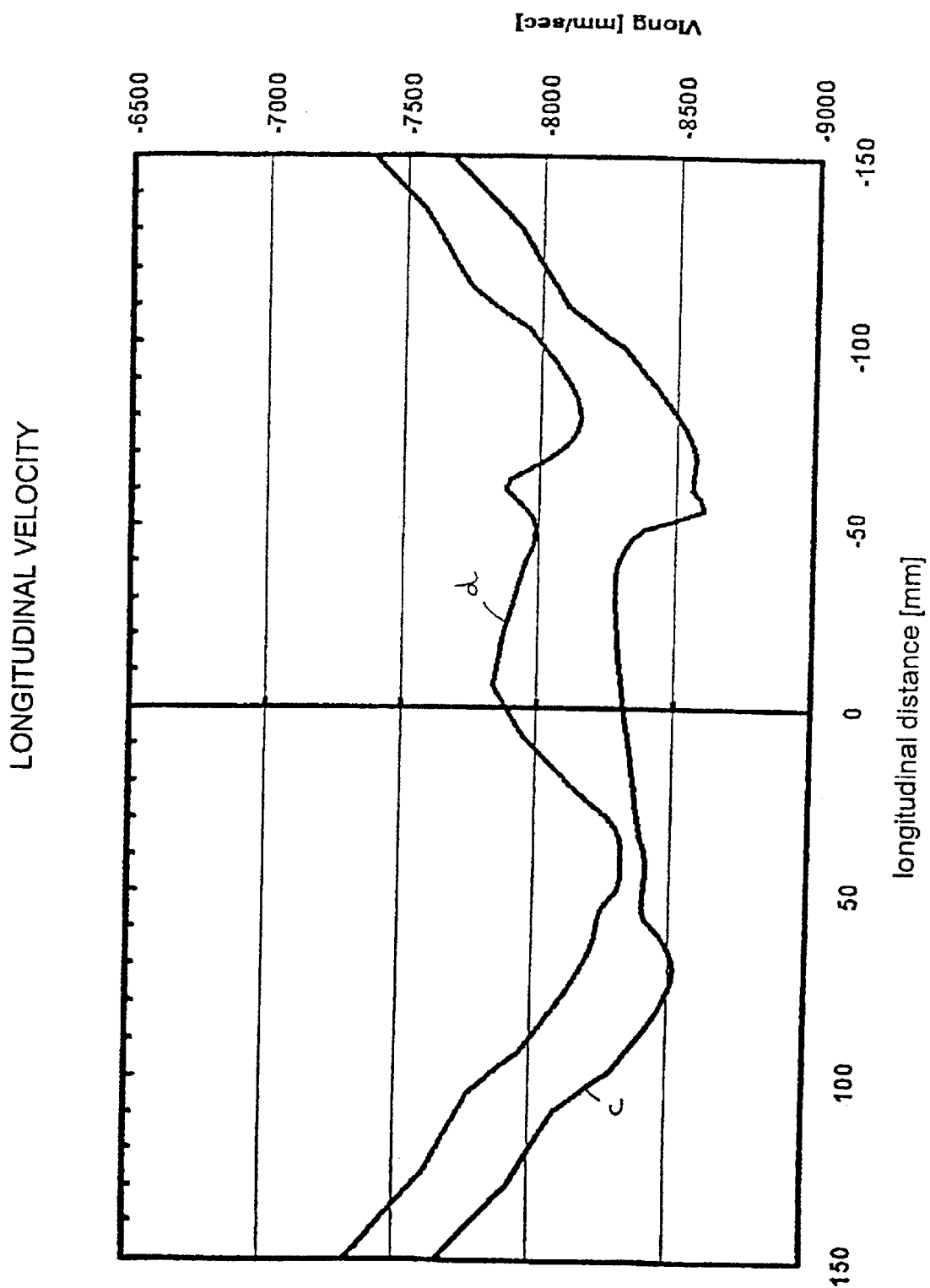
FIG. 8 shows cyclic curves of the longitudinal velocity of a point at tread level on the crown of the tyre of FIG. 1, in conditions of free (neutral) rolling and braking, with detail on the area of contact between the tyre and the road.

FIG. 8 shows cyclic curves c and d of the longitudinal velocity ($V_{long}$) of the point of the tyre situated at tread level on the crown, in a situation of free rolling (curve c) at a velocity of 30 km/hr, and braking (curve d). The curves are limited to the longitudinal positions of the point in the footprint area and are determined with a vertical load of 250 kg on a surface having a coefficient of friction of 0.8.

The values of the quantities examined, or rather the sequence of the values in each cycle, are modified when the tyre starts to skid and consequently its adhesion performance starts to decrease. By making the comparison between the current curve and the preceding one, and thus by instantaneously comparing the "normal" reference curve obtained in conditions of optimal adhesion with that obtained in conditions of skidding, it is possible to determine, in real time, that the tyre has started to perform less than optimally. This makes it possible to set the necessary corrective actions by controlling the braking action of the braking mechanisms of the motor vehicle.

Figure 9:
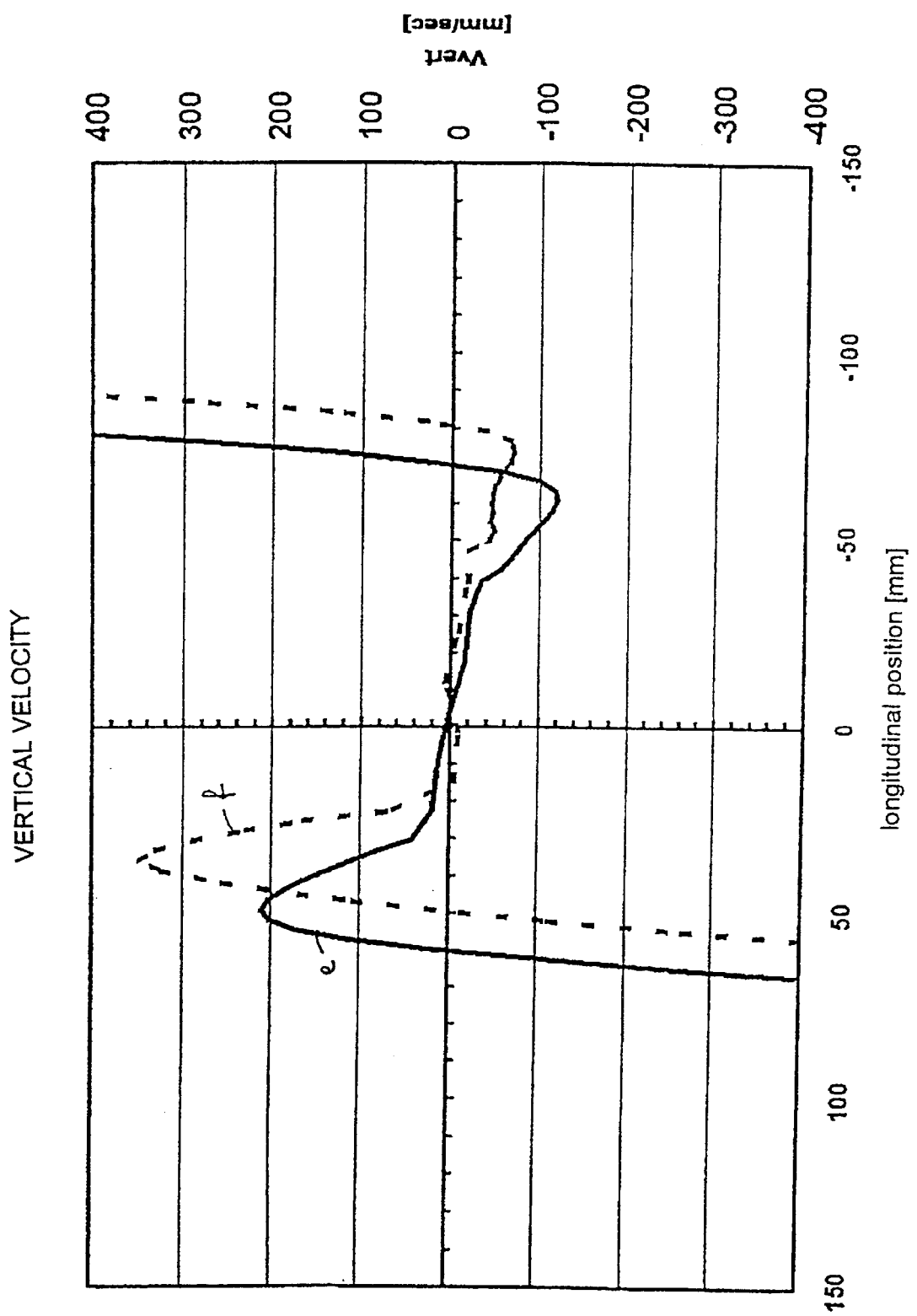
FIG. 9 shows cyclic curves of the vertical velocity of a point at liner level on the crown of the tyre of FIG. 1, in conditions of braking on road surfaces having different coefficients of friction, with detail on the area of contact between the tyre and the road.

FIG. 9 shows cyclic curves e and f of the vertical velocity ($V_{vert}$) of the point of the tyre situated at the liner level in the crown, in a braking situation and in different road friction conditions, particularly on surfaces having a coefficient of friction of 0.4 (curve e) and 1.2 (curve f). The curves are limited to the longitudinal positions of the point in the footprint area and are determined with a vertical load of 350 kg.

Figure 10:
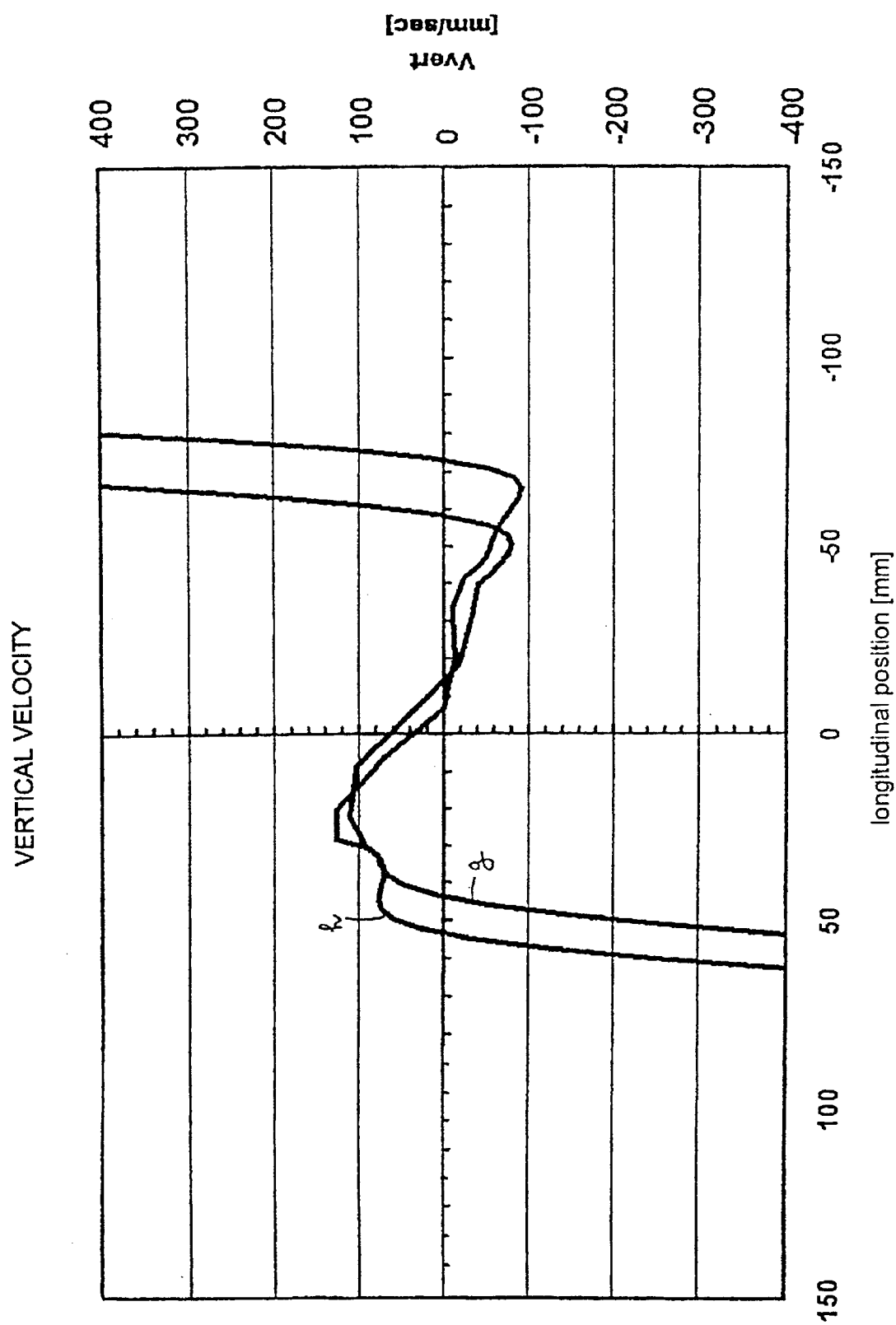
FIG. 10 shows cyclic curves of the vertical velocity of a point at liner level on the crown of the tyre of FIG. 1, in conditions of braking with different vertical load conditions, with detail on the area of contact between the tyre and the road.

The variation of vertical load also causes modifications of the cyclic curves. This is clear from FIG. 10, which shows cyclic curves, g and h, of the vertical velocity ($V_{vert}$) of the point of the tyre situated at the liner level in the crown, in a braking situation, on a surface having a coefficient of friction of 0.8. The curves are limited to the longitudinal positions of the point in the footprint area and are determined with vertical loads of, respectively, 250 kg (curve g) and 350 kg (curve h).

Figure 11:
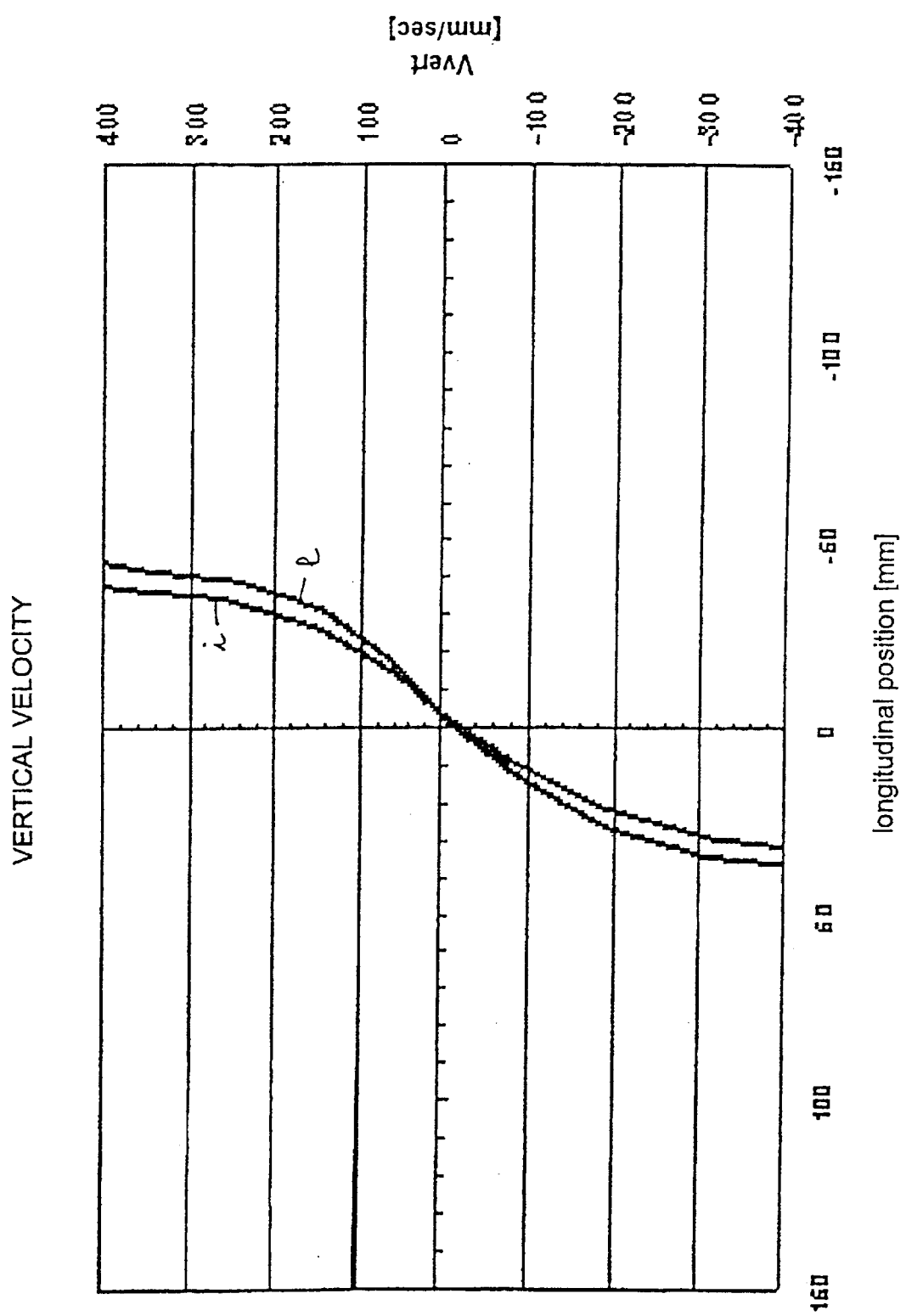
FIG. 11 shows cyclic curves of the vertical velocity of a point at liner level on the shoulder of the tyre of FIG. 1, in conditions of free rolling and braking, with detail on the area of contact between the tyre and the road.

FIG. 11 shows cyclic curves, i and l, of the vertical velocity ($V_{vert}$) of the point of the tyre situated at the liner level in the shoulder, in a free rolling situation (curve i) at the velocity of 30 km/hr, and in a braking situation (curve 1).

It is found that the measurement of a quantity (velocity) at one or more points of the tyre (followed by the analysis of the variation of the differences between two or more measurements with time) provides a set of data which can be used to establish the instantaneous behaviour of the tyre, or, more precisely, the instantaneous variation of the behaviour of the tyre.

The preceding description shows that the method and device according to the invention make it possible to know the behaviour of a tyre by analysing the data obtained from any point of the tyre during its rolling. The analysis of these data indicates the state of stress in which the tyre is operating during the running of the motor vehicle on the road.

What is claimed is:

1. A method for monitoring instantaneous behaviour of a tyre during running of a motor vehicle, comprising the steps of:

associating three spatial directions with the tyre;

acquiring and storing, at least temporarily, at least one basic reference curve representing variation of a displacement of at least one specified point of the tyre in at least one of the three spatial directions as a function of a spatial position of the at least one specified point during at least one portion of a revolution of the tyre;

continuously acquiring first signals representing the spatial position of the at least one specified point during the at least one portion of the revolution of the tyre;

deriving from the spatial position signals of the at least one specified point at least one cyclic curve of current operating displacement in the at least one of the three spatial directions as a function of the spatial position of the at least one specified point during the at least one portion of the revolution of the tyre;

continuously comparing the at least one cyclic curve of current operating displacement with the at least one basic reference curve; and emitting a second signal depending on results of the comparison;

wherein the tyre comprises at least one tread and one casing, wherein the three spatial directions are longitudinal, transverse, and vertical, and wherein the second signal indicates an instantaneous behaviour of the tyre.

2. The method of claim 1, wherein the at least one basic reference curve is acquired during the running of the motor vehicle during an earlier revolution of the tyre, wherein the at least one basic reference curve is temporarily stored for a specified period, and wherein the at least one cyclic curve of current operating displacement is derived from spatial position signals acquired during a later revolution of the tyre.

3. The method of claim 2, wherein the earlier revolution immediately precedes the later revolution.

4. The method of claim 1, wherein the at least one basic reference curve is acquired before the running of the motor vehicle, and wherein the at least one basic reference curve is permanently stored.

5. The method of claim 1, wherein a state of deformation of the casing in a vicinity of a point in an area of contact between the tyre and a surface contacted by the tyre is measured using the at least one basic reference curve and the at least one cyclic curve of current operating displacement, wherein the state of deformation is used to evaluate adhesion present between the tyre and the surface contacted by the tyre, and wherein the state of deformation is used to evaluate a capacity of the tyre to develop forces tangential to the tyre in the area of contact.

6. The method of claim 5, wherein first signals representing the spatial position of at least two specified points are continuously acquired during the at least one portion of the revolution of the tyre, wherein at least one cyclic curve of current operating displacement is derived from the spatial position signals of each of the at least two specified points, wherein the cyclic curves of current operating displacement of the at least two specified points are continuously compared with each other to reveal at least one of acquisition errors, rapid changes in the state of deformation, or acquisition errors and rapid changes in the state of deformation.

7. The method of claim 1, further comprising the steps of:

obtaining at least one basic reference curve of velocity of the at least one specified point by calculating a derivative with respect to time of the at least one basic reference curve representing the variation of the displacement of the at least one specified point;

storing, at least temporarily, the at least one basic reference curve of velocity;

obtaining at least one cyclic curve of operating velocity of the at least one specified point by calculating a derivative with respect to time of the at least one cyclic curve of current operating displacement of the at least one specified point; and continuously comparing the at least one cyclic curve of operating velocity with the at least one basic reference curve of velocity.

8. The method of claim 7, wherein a state of deformation of the casing in a vicinity of a point in an area of contact between the tyre and a surface contacted by the tyre is measured using the at least one basic reference curve and the at least one cyclic curve of current operating displacement, wherein the state of deformation is used to evaluate adhesion present between the tyre and the surface contacted by the tyre, and wherein the state of deformation is used to evaluate a capacity of the tyre to develop forces tangential to the tyre in the area of contact.

9. The method of claim 8, wherein first signals representing the spatial position of at least two specified points are continuously acquired during the at least one portion of the revolution of the tyre, wherein at least one cyclic curve of current operating displacement is derived from the spatial position signals of each of the at least two specified points, and wherein the cyclic curves of current operating displacement of the at least two specified points are continuously compared with each other to reveal at least one of acquisition errors, rapid changes in the state of deformation, or acquisition errors and rapid changes in the state of deformation.

10. The method of claim 7, wherein a state of deformation of the casing in a vicinity of a point in an area of contact between the tyre and a surface contacted by the tyre is measured using the at least one basic reference curve of velocity and the at least one cyclic curve of operating velocity, wherein the state of deformation is used to evaluate adhesion present between the tyre and the surface contacted by the tyre, and wherein the state of deformation is used to evaluate a capacity of the tyre to develop forces tangential to the tyre in the area of contact.

11. The method of claim 10, wherein first signals representing the spatial position of at least two specified points are continuously acquired during the at least one portion of the revolution of the tyre, wherein at least one cyclic curve of current operating displacement is derived from the spatial position signals of each of the at least two specified points, wherein at least one cyclic curve of operating velocity is obtained by calculating a derivative with respect to time of the at least one cyclic curve of current operating displacement of each of the at least two specified points, and wherein the cyclic curves of operating velocity of the at least two specified points are continuously compared with each other to reveal at least one of acquisition errors, rapid changes in the state of deformation, or acquisition errors and rapid changes in the state of deformation.

12. The method of claim 7, wherein a state of deformation of the casing in a vicinity of a point in an area of contact between the tyre and a surface contacted by the tyre is measured using the at least one basic reference curve, the at least one cyclic curve of current operating displacement, the at least one basic reference curve of velocity, and the at least one cyclic curve of operating velocity, wherein the state of deformation is used to evaluate adhesion present between the tyre and the surface contacted by the tyre, and wherein the state of deformation is used to evaluate a capacity of the tyre to develop forces tangential to the tyre in the area of contact.

13. The method of claim 12, wherein first signals representing the spatial position of at least two specified points are continuously acquired during the at least one portion of the revolution of the tyre, wherein at least one cyclic curve of current operating displacement is derived from the spatial position signals of each of the at least two specified points, wherein at least one cyclic curve of operating velocity is obtained by calculating a derivative with respect to time of the at least one cyclic curve of current operating displacement of each of the at least two specified points, wherein the cyclic curves of current operating displacement of the at least two specified points are continuously compared with each other to reveal at least one of acquisition errors, rapid changes in the state of deformation, or acquisition errors and rapid changes in the state of deformation, and wherein the cyclic curves of operating velocity of the at least two specified points are continuously compared with each other to reveal at least one of acquisition errors, rapid changes in the state of deformation, or acquisition errors and rapid changes in the state of deformation.

14. A method for monitoring instantaneous behaviour of a tyre during running of a motor vehicle, comprising the steps of:

associating three spatial directions with the tyre;

acquiring at least one basic reference curve representing variation of a displacement of at least one specified point of the tyre in at least one of the three spatial directions as a function of a spatial position of the at least one specified point during at least one portion of a revolution of the tyre;

obtaining at least one basic reference curve of velocity of the at least one specified point by calculating a derivative with respect to time of the at least one basic reference curve representing the variation of the displacement of the at least one specified point;

storing, at least temporarily, the at least one basic reference curve of velocity;

continuously acquiring first signals representing the spatial position of the at least one specified point during the at least one portion of the revolution of the tyre;

deriving from the spatial position signals of the at least one specified point at least one cyclic curve of current operating displacement in the at least one of the three spatial directions as a function of the spatial position of the at least one specified point during the at least one portion of the revolution of the tyre;

obtaining at least one cyclic curve of operating velocity of the at least one specified point by calculating a derivative with respect to time of the at least one cyclic curve of current operating displacement of the at least one specified point;

continuously comparing the at least one cyclic curve of operating velocity with the at least one basic reference curve of velocity; and emitting a second signal depending on results of the comparison;

wherein the tyre comprises at least one tread and one casing, wherein the three spatial directions are longitudinal, transverse, and vertical, and wherein the second signal indicates an instantaneous behaviour of the tyre.

15. The method of claim 14, wherein a state of deformation of the casing in a vicinity of a point in an area of contact between the tyre and a surface contacted by the tyre is measured using the at least one basic reference curve of velocity and the at least one cyclic curve of operating velocity, wherein the state of deformation is used to evaluate adhesion present between the tyre and the surface contacted by the tyre, and wherein the state of deformation is used to evaluate a capacity of the tyre to develop forces tangential to the tyre in the area of contact.

16. The method of claim 15, wherein first signals representing the spatial position of at least two specified points are continuously acquired during the at least one portion of the revolution of the tyre, wherein at least one cyclic curve of current operating displacement is derived from the spatial position signals of each of the at least two specified points, wherein at least one cyclic curve of operating velocity is obtained by calculating a derivative with respect to time of the at least one cyclic curve of current operating displacement of each of the at least two specified points, and wherein the cyclic curves of operating velocity of the at least two specified points are continuously compared with each other to reveal at least one of acquisition errors, rapid changes in the state of deformation, or acquisition errors and rapid changes in the state of deformation.

17. A device for monitoring instantaneous behaviour of a tyre during running of a motor vehicle, comprising:
   means for acquiring and storing, at least temporarily, at least one basic reference curve representing variation of a displacement of at least one specified point of the tyre in at least one of three spatial directions as a function of a spatial position of the at least one specified point during at least one portion of a revolution of the tyre;
   at least one sensor means, associated with the at least one specified point, emitting first signals representing the spatial position of the at least one specified point;
   pick-up means continuously acquiring the spatial position signals during at least one portion of the revolution of the tyre; and
   processor means deriving from the spatial position signals of the at least one sensor means at least one cyclic curve of current operating displacement in the at least one of three spatial directions as a function of the spatial position of the at least one specified point during the at least one portion of the revolution of the tyre;
   wherein the processor means continuously compares the at least one cyclic curve of current operating displacement with the at least one basic reference curve,
   wherein the processor means emits a second signal depending on results of the comparison,
   wherein the tyre comprises at least one tread and one casing,
   wherein the three spatial directions are longitudinal, transverse, and vertical, and
   wherein the second signal indicates an instantaneous behaviour of the tyre.

18. The device of claim 17, wherein the at least one basic reference curve is acquired during the running of the motor vehicle during a first revolution of the tyre, and
   wherein the at least one cyclic curve of current operating displacement is derived from spatial position signals acquired during a second revolution of the tyre.

19. The device of claim 18, wherein the first revolution immediately precedes the second revolution.

20. The device of claim 17, wherein the at least one basic reference curve is acquired before the running of the motor vehicle, and
   wherein the at least one basic reference curve is permanently stored.

21. The device of claim 17, wherein the processor means measures a state of deformation of the casing in a vicinity of a point in an area of contact between the tyre and a surface contacted by the tyre using the at least one basic reference curve and the at least one cyclic curve of current operating displacement,
   wherein the state of deformation is used to evaluate adhesion present between the tyre and the surface contacted by the tyre, and
   wherein the state of deformation is used to evaluate a capacity of the tyre to develop forces tangential to the tyre in the area of contact.

22. The device of claim 21, wherein at least two sensor means are each associated with at least one specified point,
   wherein each sensor means emits first signals representing the spatial position of the associated at least one specified point,
   wherein the processor means derives at least one cyclic curve of current operating displacement from the spatial position signals of each sensor means, and
   wherein the processor means continuously compares the cyclic curves of current operating displacement of the sensor means with each other to reveal at least one of acquisition errors, rapid changes in the state of deformation, or acquisition errors and rapid changes in the state of deformation.

23. The device of claim 17, wherein the processor means obtains at least one basic reference curve of velocity of the at least one specified point by calculating a derivative with respect to time of the at least one basic reference curve representing the variation of the displacement of the at least one specified point,
   wherein the processor means obtains at least one cyclic curve of operating velocity of the at least one specified point by calculating a derivative with respect to time of the at least one cyclic curve of current operating displacement of the at least one specified point, and
   wherein the processor means continuously compares the at least one cyclic curve of operating velocity with the at least one basic reference curve of velocity.

24. The device of claim 23, wherein the processor means measures a state of deformation of the casing in a vicinity of a point in an area of contact between the tyre and a surface contacted by the tyre using the at least one basic reference curve and the at least one cyclic curve of current operating displacement,
   wherein the state of deformation is used to evaluate adhesion present between the tyre and the surface contacted by the tyre, and
   wherein the state of deformation is used to evaluate a capacity of the tyre to develop forces tangential to the tyre in the area of contact.

25. The device of claim 24, wherein at least two sensor means are each associated with at least one specified point,
   wherein each sensor means emits signals representing the spatial position of the associated at least one specified point,
   wherein the processor means derives at least one cyclic curve of current operating displacement from the spatial position signals of each sensor means, and
   wherein the processor means continuously compares the cyclic curves of current operating displacement of the sensor means with each other to reveal at least one of acquisition errors, rapid changes in the state of deformation, or acquisition errors and rapid changes in the state of deformation.

26. The device of claim 23, wherein the processor means measures a state of deformation of the casing in a vicinity of a point in an area of contact between the tyre and a surface contacted by the tyre using the at least one basic reference curve of velocity and the at least one cyclic curve of operating velocity,
   wherein the state of deformation is used to evaluate adhesion present between the tyre and the surface contacted by the tyre, and
   wherein the state of deformation is used to evaluate a capacity of the tyre to develop forces tangential to the tyre in the area of contact.

27. The device of claim 26, wherein at least two sensor means are each associated with at least one specified point,
   wherein each sensor means emits first signals representing the spatial position of the associated at least one specified point, wherein the processor means derives at least one cyclic curve of current operating displacement from the spatial position signals of each sensor means, wherein the processor means obtains at least two cyclic curves of operating velocity by calculating derivatives with respect to time of each cyclic curve of current operating displacement, and wherein the processor means continuously compares the cyclic curves of operating velocity with each other to reveal at least one of acquisition errors, rapid changes in the state of deformation, or acquisition errors and rapid changes in the state of deformation.

28. The device of claim 23, wherein the processor means measures a state of deformation of the casing in a vicinity of a point in an area of contact between the tyre and a surface contacted by the tyre using the at least one basic reference curve, the at least one cyclic curve of current operating displacement, the at least one basic reference curve of velocity, and the at least one cyclic curve of operating velocity, wherein the state of deformation is used to evaluate adhesion present between the tyre and the surface contacted by the tyre, and wherein the state of deformation is used to evaluate a capacity of the tyre to develop forces tangential to the tyre in the area of contact.

29. The device of claim 24, wherein at least two sensor means are each associated with at least one specified point, wherein each sensor means emits first signals representing the spatial position of the associated at least one specified point, wherein the processor means derives at least one cyclic curve of current operating displacement from the spatial position signals of each sensor means, wherein the processor means obtains at least two cyclic curves of operating velocity by calculating derivatives with respect to time of each cyclic curve of current operating displacement, wherein the processor means continuously compares the cyclic curves of current operating displacement of the sensor means with each other to reveal at least one of acquisition errors, rapid changes in the state of deformation, or acquisition errors and rapid changes in the state of deformation, and wherein the processor means continuously compares the cyclic curves of operating velocity with each other to reveal at least one of acquisition errors, rapid changes in the state of deformation, or acquisition errors and rapid changes in the state of deformation.

30. A device for monitoring instantaneous behaviour of a tyre during running of a motor vehicle, comprising:

means for acquiring at least one basic reference curve representing variation of a displacement of at least one specified point of the tyre in at least one of three spatial directions as a function of a spatial position of the at least one specified point during at least one portion of a revolution of the tyre;

means for obtaining at least one basic reference curve of velocity of the at least one specified point by calculating a derivative with respect to time of the at least one basic reference curve representing the variation of the displacement of the at least one specified point;

means for storing, at least temporarily, the at least one basic reference curve of velocity;

at least one sensor means, associated with the at least one specified point, emitting signals representing the spatial position of the at least one specified point;

pick-up means continuously acquiring the spatial position signals during at least one portion of the revolution of the tyre; and processor means deriving from the spatial position signals of the at least one sensor means at least one cyclic curve of current operating displacement in the at least one of three spatial directions as a function of the spatial position of the at least one specified point during the at least one portion of the revolution of the tyre and obtaining at least one cyclic curve of operating velocity of the at least one specified point by calculating a derivative with respect to time of the at least one cyclic curve of current operating displacement;

wherein the processor means continuously compares the at least one cyclic curve of operating velocity with the at least one basic reference curve of velocity, wherein the processor means emits a second signal depending on results of the comparison, wherein the tyre comprises at least one tread and one casing, wherein the three spatial directions are longitudinal, transverse, and vertical, and wherein the second signal indicates an instantaneous behaviour of the tyre.

31. The device of claim 30, wherein the processor means measures a state of deformation of the casing in a vicinity of a point in an area of contact between the tyre and a surface contacted by the tyre using the at least one basic reference curve of velocity and the at least one cyclic curve of operating velocity, wherein the state of deformation is used to evaluate adhesion present between the tyre and the surface contacted by the tyre, and wherein the state of deformation is used to evaluate a capacity of the tyre to develop forces tangential to the tyre in the area of contact.

32. The device of claim 31, wherein at least two sensor means are each associated with at least one specified point, wherein each sensor means emits first signals representing the spatial position of the associated at least one specified point, wherein the processor means derives at least one cyclic curve of current operating displacement from the spatial position signals of each sensor means, wherein the processor means obtains at least two cyclic curves of operating velocity by calculating derivatives with respect to time of each cyclic curve of current operating displacement, and wherein the processor means continuously compares the cyclic curves of operating velocity with each other to reveal at least one of acquisition errors, rapid changes in the state of deformation, or acquisition errors and rapid changes in the state of deformation.

* * * * *